Patented Aug. 11, 1936

2,050,926

UNITED STATES PATENT OFFICE 2,050,926

PROCESS FOR BREAKING PETROLEUM EMULSIONS

Melvin De Groote, St. Louis, and Bernhard Keiser, Webster Groves, Mo., assignors to Tretolite Company, Webster Groves, Mo., a corporation of Missouri No Drawing. Original application December 31, 1934, Serial No. 760,030. Divided and this application November 25, 1935, Serial No. 51,470

1 Claim. (Cl. 196—4)

This invention relates to the treatment of emulsions of mineral oil and water, such as petroleum emulsions, for the purpose of separating the oil from the water, the present application being a division of our co-pending application for Patent Serial No. 760,030, filed December 31, 1934.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings."

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent used in the process which forms the subject-matter of our co-pending application for patent previously mentioned, consists of an oxy-hendecenoic acid material, and particularly a material of the kind in which an oxy-hendecenoic acid body has entered into an esterification reaction in the capacity of an alcohol. The most desirable reagents are those obtained by reaction of an hendecenoic acid body and a detergent-forming acid of the kind hereinafter described, or else with a polybasic carboxy acid.

Hendecenoic acid is an unsaturated acid cimilar to certain fatty acids, but apparently not occurring naturally in any fat or oil. It is a lower homologue of oleic acid, and is obtained by distilling ricinoleic acid or the glyceride thereof (castor oil) under diminished or atmospheric pressure. It is sometimes known as undecylenic acid. The method of producing said acid is well known and is described in the publication "Dictionary of Applied Chemistry", by Thorpe, 1922. In volume 4, pages 630 and 631 of the said publication, the formation of hendecenoic acid is indicated as follows:

$$C_{17}H_{34}O_3 = C_6H_{13}CHO + C_{11}H_{20}O_2$$

In producing the treating agent or demulsifying agent, it is not necessary that the hendecenoic acid, which is employed as a raw material, be absolutely pure, but it may be of a technical quality, so as to contain some unconverted castor oil and certain products of decomposition other than hendecenoic acid. It may contain some oenanthol (heptoic aldehyde). This aldehyde can be removed by blowing air or an inert gas through the commercial hendecenoic acid at a relatively low temperature.

As stated in our co-pending application, hendecenoic acid of technical purity may be subjected to oxidation by any of the methods conventionally employed for oxidation of castor oil, and the like. Our preference is to oxidize hendecenoic acid at relatively low temperatures by means of moist air under pressure. We prefer to use a temperature of 125° to 135° C. and to use approximately 45 to 75 lbs. pressure. If desired, hendecenoic acid may be oxidized at a higher temperature by means of air or oxygen at atmospheric pressure.

We have referred to the product obtained by oxidizing hendecenoic acid as "oxyhendecenoic acid". The expression "oxyhendecenoic acid" is intended to refer to the derivatives in which additional oxygen has been introduced into the molecules. For instance, this may be in the manner indicated by the formula $C_{11}H_{20}O_3$. This represents the saturation of the ethylene linkage by means of an atom of oxygen. It is believed that oxidation, especially with moist air, results in the conversion of this added oxygen atom into two hydroxyl radicals, so that ultimately one apparently obtains dihydroxyhendecatoic acid, as indicated by the formula $C_{11}H_{20}(OH)_2O_2$. In other words, the addition product of hendecenoic acid is the substitution product, at least hypothetically, of hendecatoic acid.

In order to summarize what has been said previously, one may consider hendecenoic acid as being $C_{10}H_{19}COOH$. The hendecenoic acid residue $C_{10}H_{19}$ may be designated for sake of convenience as T, and thus the acid may be considered as T.COOH, and the oxy acid may be considered as Y.T.COOH, wherein Y is at least one oxygen atom, or at least, one hydroxyl radical, COO is a conventional carboxyl residue, and T.COO is the hendecenoic acid radical. Y.T.COOH is an alcoholic type acid in the same sense that ricinoleic acid is an alcoholic acid. Y.T.COOH may be converted into a salt or ester, and thus be written Y.T.COOZ, in which Z is an acidic hydrogen or its equivalent in the case of a salt or ester.

Those reactions which involve Y.T.COOH acting as an acid means that the acidic hydrogen H will be replaced by a metallic atom or by an organic radical, and of course, will be contemplated by the formula, Y.T.COOZ, as previously described.

As to reactions of oxy-hendecenoic acid bodies in which the acid bodies act as an acid, reference is made to the following paragraph in our co-pending application: "After producing such oxyhendecenoic acid bodies, as previously explained, they may be used in the acid condition or neutralized with any suitable base, so as to produce an ammonium salt, a sodium salt, potassium salt, calcium salt, magnesium salt, etc., or they may be esterified with any suitable alcohol, such as ethyl alcohol, methyl alcohol, etc., so as to produce an ester. Such oxyhendecenoic acids may be combined with basic amines, such as triethanolamine."

We prepare our preferred reagent in the following manner:

Hendecenoic acid of technical purity is cautiously oxidized to yield dihydroxyhendecatoic acid. Approximately 148 lbs. of phthalic anhydride are mixed with 92 lbs. of glycerol and heated for approximately 10 to 15 minutes at 125-150° C., until a thin, water-white liquid resin intermediate free from any unreacted-on glycerol has been produced. This product is characterized by having a free hydroxyl radical available for further esterification. To this liquid resin intermediate, free from unreacted-on glycerol, there is added 218 lbs. of dihydroxyhendecatoic acid, and the mixture is heated from 150-250° C. for approximately 10 to 30 minutes after it is cooled and is diluted to 10-50%, by weight, of denatured alcohol. The compound is then ready for use and should not exhibit any free carboxylic hydrogen. Should a small amount of acidity be present, it may be neutralized by the addition of triethanolamine.

Esterification may take place not only with an alcohol, but with an alcohol acid type of material, such as ricinoleic acid. Oxyhendecenoic acid bodies may react with the hydroxyl of an oxy acid, such as ricinoleic acid, or the like, and the ester so produced may be further neutralized by the addition of the usual bases, such as caustic soda, etc.

It is immaterial as to the particular method employed to neutralize various demulsifying agents. The following paragraph appears in our co-pending application referred to above:

The use of demulsifying agents consisting of various carboxy acids or compounds having more than one carboxyl group, is well known in the treatment of water-in-oil emulsions. In the use of conventional demulsifying agents it is the common practice to use them not only in the form of acids, but also in the form of salts or esters, or half salts, or half esters, or ester salts, in case of dibasic acids. Where such reagents have both a carboxylic hydrogen and a sulfonic hydrogen, it is well known that only the sulfonic hydrogen need be neutralized, if desired. The salts generally employed are the sodium salt, potassium salt, ammonium salt, calcium, magnesium, the triethanolamine salt, etc. The esters may be employed, such as the methyl ester, ethyl ester, propyl ester, butyl ester, amyl ester, hexyl ester, octyl ester, etc. Aromatic or cyclic esters may be employed. What has been said in regard to the use of conventional demulsifying agents applies also to the materials employed as the demulsifying agent of our process.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water-solubility. Sometimes they may be used in a form which exhibits relatively limited water-solubility and relatively limited oil-solubility. However, since such reagents are sometimes used in a ratio of 1 to 10,000, or 1 to 20,000, or 1 to 30,000, such an apparent insolubility in oil and water is not significant, because said reagents undoubtedly have solubility within the concentration employed. This same fact is true in regard to the material or materials employed as the demulsifying agent of our process.

In practising our invention, a treating agent or demulsifying agent of the kind above described is brought into contact with or caused to act upon the emulsion to be treated, in any of the various ways or by any of the various apparatus now generally used to resolve or break petroleum emulsions with a chemical reagent.

Having thus described our invention, what we claim as new and desire to secure by Letters Patent is:

A process for breaking petroleum emulsions of the water-in-oil type, which consists in subjecting the emulsion to the action of a demulsifying agent obtained by a reaction involving oxyhendecenoic acid acting as an acid, and said demulsifying agent being characterized by the type formula Y.T.COO.Z, wherein Y is at least one oxygen atom or at least one hydroxyl radical, T is the hendecenoic acid residue $C_{10}H_{19}$, COO is the conventional carboxyl residue, and Z is an acidic hydrogen equivalent, selected from the class consisting of organic radicals, metallic atoms and amine radicals.

MELVIN DE GROOTE.
BERNHARD KEISER.